UNITED STATES PATENT OFFICE.

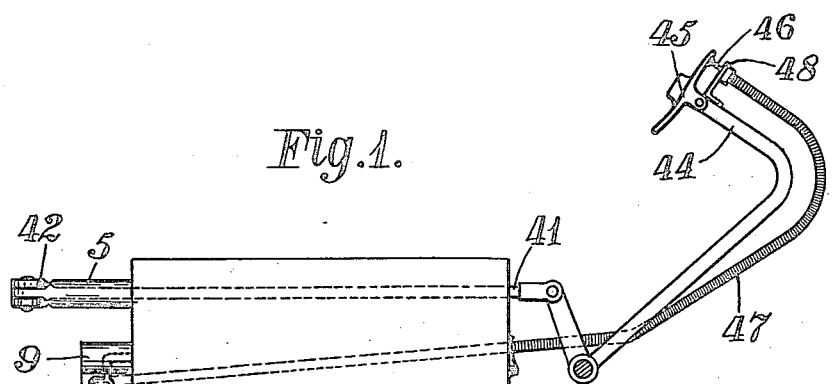
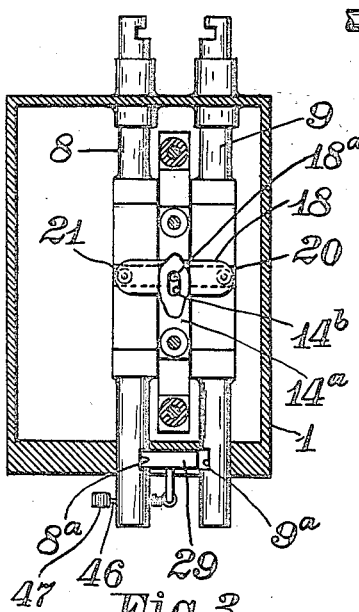
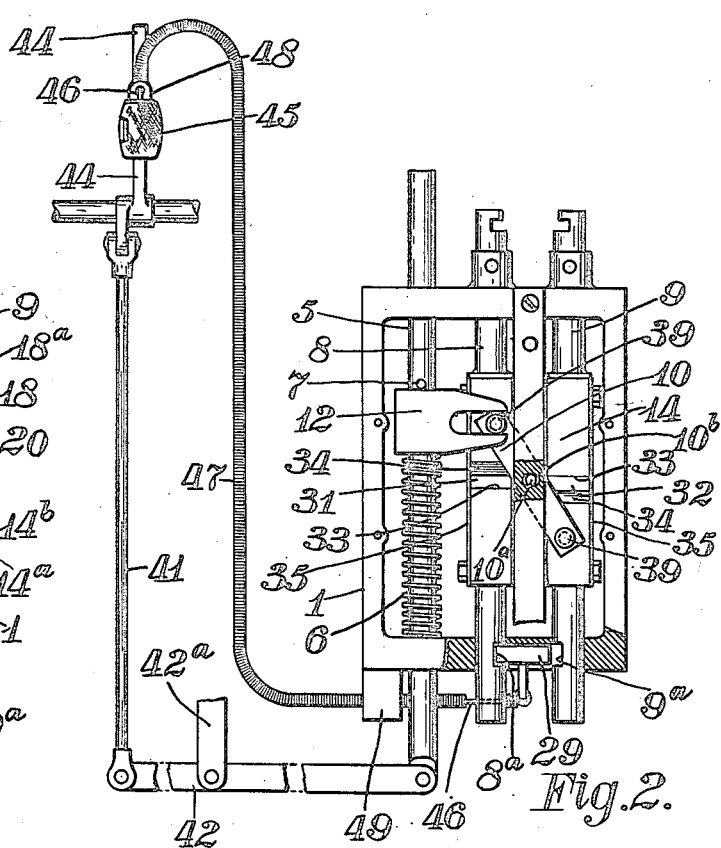

JAMES S. ALSPAUGH, OF PORTSMOUTH, OHIO.

GEAR-SHIFTING MECHANISM.

1,402,131.   Specification of Letters Patent.   Patented Jan. 3, 1922.

Application filed January 7, 1921. Serial No. 435,622.

*To all whom it may concern:*

Be it known that I, JAMES S. ALSPAUGH, a citizen of the United States, residing at Portsmouth, in the county of Scioto and State of Ohio, have invented a certain new and useful Improvement in Gear-Shifting Mechanisms, of which the following is a specification.

The invention relates more particularly to gear shift mechanism for motor vehicles of the sliding type such as used for example, in the "Cadillac" and many other cars. In this sort of mechanism, as is well understood, a hand lever is used to shift gear into low, intermediate, high and reverse, such mechanism including two rods, one of which is shifted to obtain low or reverse and the other shifted to obtain intermediate or high. The object of the invention is to dispense with the use of the hand operated lever in such or similar mechanism and provide simple and inexpensive means whereby the gear shifting operations may be controlled and performed altogether with the foot of the operator on the clutch lever.

The invention is embodied in the example herein shown and described, the features of novelty being finally claimed.

In the accompanying drawing—

Figure 1 is a view of the invention in side elevation.

Fig. 2 is a plan view with the cover of the gear shift rod box removed and a portion of the box broken out to show details.

Fig. 3 is a horizontal section of the gear shift rod box showing mechanism therein lying below the parts shown in Fig. 2.

The gear shifting devices shown includes generally the usual rods 8 and 9 mounted in a suitable frame or box 1. The rod 9 actuates the speed changing gear (not shown) to secure low and reverse motions and the rod 8 the intermediate and high. In the present illustration the rods 8 and 9 are provided in their upper faces with transverse grooves 20 and 21 standing opposite each other in the neutral position to receive the opposite ends of a floating lever 18. Sliding in a suitable frame above the rods 8 and 9 is a plate 14 having in its upper face cross grooves 31 and 32 with their bottoms in line with each other, the opposing walls 33 being vertical to form abutments while the other walls 34 are slanting.

Pivoted above the slide 14 is an oscillatory member 10 carrying at each of its ends hollow studs 39 containing spring pressed latch pins to enter the grooves 31 or 32 according to the position of the members. The oscillatory member 10 is slotted at $10^b$ and fulcrumed on pin $10^a$ so that the axis of its motion is shiftable laterally.

The oscillatory member 10 is actuated by a forked block 12 on a shiftable rod 5 extending longitudinally through the frame 1. The forked block 12 embraces the left hand stud 39 and is held yieldingly in position on the rod 5 between a coil spring 6 encircling the rod within the frame and a pin 7 on said rod 5. The rod 5 is operated in the rearward direction by foot pressure on the clutch lever 44 connected to said rod by a rod 41 and a lever 42 fulcrumed on a fixed bracket $42^a$. In this construction, therefore, the operation of the clutch lever in the forward direction releases the clutch, as usual, and draws the block 12 rearward, the spring 6 aiding in pressing said block forward when the clutch lever is thrown rearward by its own usual spring. When the member 10 is sufficiently oscillated in one direction by the operation of the block 12 one of the latch pins in lug 39 is projected into its groove 31 or 32 and upon oscillation said pin engages the abutment wall of said groove and carries the slide in the corresponding direction. When a latch pin of the member 10 is engaged with the slide to move the latter the movement is limited by the engagement of the pin with the right angled corner of the groove formed by the strip 35. In such movement the opposite pin rides up the beveled wall of its groove and onto the face of the slide 14. The cross slot $10^b$ permits endwise movement of the member 10 when the latch pin is confined by strip 35 and swung by the abutment wall of the groove 31 or 32. The slide can be given a full stroke for operating one of the rods 8 or 9 or it can be given a lesser movement in either direction, as for example, to place the slide in position for full actuation in the desired direction, as hereinafter explained. The slide 14 has affixed to its lower side a longitudinally extending bar $14^a$ on which is carried the floating lever member 18. The member 18 is provided with a pin $18^a$ entering a longitudinal slot $14^b$ in the bar $14^a$, said slot being of sufficient length to permit limited movement of the slide 14 to present the selected abutment 33 as heretofore referred to without operating the floating lever 18.

The rear ends of the rods 8 and 9 are provided with notches 8ª and 9ª respectively that stand directly opposite each other when the rods are in neutral position; and in the rear of the box is a latch piece 29 adapted to be shifted to engage either of said notches but not both at the same time. The latch 29 is made of such length that when it is engaged with one notch it is held from movement out of that notch by the other rod when the latter is shifted.

The particular gear shifting mechanism herein before referred to forms the subject of other applications for patent by me.

In the present instance the clutch lever 44 is provided with a pivoted foot piece 45; and connecting the upper part of said foot piece and the stem on the latch 29 is a flexible wire 46. For its protection and guidance said wire is passed loosely through a flexible tube 47 preferably of the kind known as Boden wire. The forward end of the flexible tube 47 is secured to a small bracket 48 fixed on the clutch lever forward of the foot piece 45 and the rear end of said tube is supported in a clamping bracket 49 on the rear end of the frame 1. When the rods are in neutral position pressure of the foot on the upper portion of the foot piece 45 shoves the latch 29 into the notch 9ª or pressure of the foot upon the lower portion of the foot piece draws the latch 29 into the notch 8ª. When, therefore, it is desired to shift the low and reverse rod 9 sufficient pressure of the foot is applied to the lower portion of the foot piece not only to draw the latch 29 into the notch 8ª but also to move the rod 9. It will be remembered that whether the rod 9 is to be moved forward into low position or rearward into reverse is a matter of selection and by repeated appropriate applications of pressure to the lower portion of the foot piece the rod 9 may be shifted back and forth as often as desired. If in an operation of the vehicle only the low or reverse are used the latch 29 may be left engaged with rod 8. In changing from low to intermediate and high pressure sufficient to actuate the latch 29 and the clutch is applied to the upper part of the foot piece 45 in which case the rod 8 is actuated. The rod 8 can be actuated back and forth as often as may be desired by simply applying the appropriate pressure to the upper portion of the foot piece to release the clutch, and move the plate 14 its full stroke.

With this invention it will be observed that a hand operated lever for shifting the gears is entirely dispensed with and that both hands of the driver are left free for holding the steering wheel. Attention is only required as to the point of application of pressure to the foot piece and the habit of properly applying the pressure is soon acquired.

The forms of the parts can be changed without departing from the gist of the invention as claimed.

What I claim is:

1. The combination with a clutch operating member and two gear shifting members, of means connected with the clutch operating member for latching one of said gear shifting members during the operation of the other.

2. The combination with a clutch operating member and two gear shifting members, of means connected with the clutch operating member for latching one of said gear shifting members during the operation of the other and means actuated by the clutch operating member for operating said gear shifting members.

3. The combination with a clutch operating member and two gear shifting members, of means connected with the clutch operating member for latching one of said gear shifting members during the operation of the other, and means common to said gear shifting members actuated by the clutch operating member for causing the operation of said gear shifting members.

4. The combination with a clutch operating member and two gear shifting members, of foot operated means connected with the clutch operating member for latching one of said gear shifting members during the operation of the other.

5. The combination with a clutch operating member and two gear shifting members, of foot operated means connected with the clutch operating member for latching one of said gear shifting members during the operation of the other and means actuated by the clutch operating member for causing the operation of said gear shifting members.

6. The combination with a clutch operating member and two gear shifting members, of a foot operated means pivoted on said clutch operating member for latching at will either of said gear shifting members during the operation of the other.

7. The combination with a clutch operating member and two gear shifting members, a latch common to said members, and a foot operated device on said clutch operating member connected with said latch, said device being operable at will to latch either of said gear shifting members when in neutral position.

8. The combination with a clutch operating member and two gear shifting members, a latch common to said members, a foot operated device on said clutch operating member connected with said latch, said device being operable at will to latch either of said gear shifting members when in neutral position, and means actuated by said clutch operating member for causing the operation of the unlatched gear shifting member.

9. The combination with a clutch operating member and two gear shifting members having a back and forth movement, a latch for said members, a foot operated device on said clutch operating member connected with said latch, said device being operable at will to latch either of said gear shifting members when in neutral position, and means actuated by said clutch operating member for causing the movement in either direction at will of the gear shifting members.

10. In a motor vehicle, the combination with a clutch lever and a gear shift mechanism including two gear shift rods, means for latching either of said rods in neutral position, means operable by the foot for actuating said latch to latch either of said rods, and means operated by the clutch lever for causing the movement of the unlatched rod.

11. In a motor vehicle, the combination with a clutch lever and a gear shift mechanism including two gear shift rods, means for latching either of said rods in neutral position, means on the clutch lever operable by the foot for actuating said latch to latch either of said rods, and means operated by the clutch lever for causing the movement of the unlatched rod.

12. In a motor vehicle, the combination with a foot operated clutch releasing member and two gear shifting members, of means operable by the foot that operates the clutch releasing member for latching one of said gear shifting members during the operation of the other gear shifting member.

JAMES S. ALSPAUGH.